P. B. RABE.
METHOD OF MAKING GRID PLATES.
APPLICATION FILED APR. 30, 1919.
1,369,353.
Patented Feb. 22, 1921.
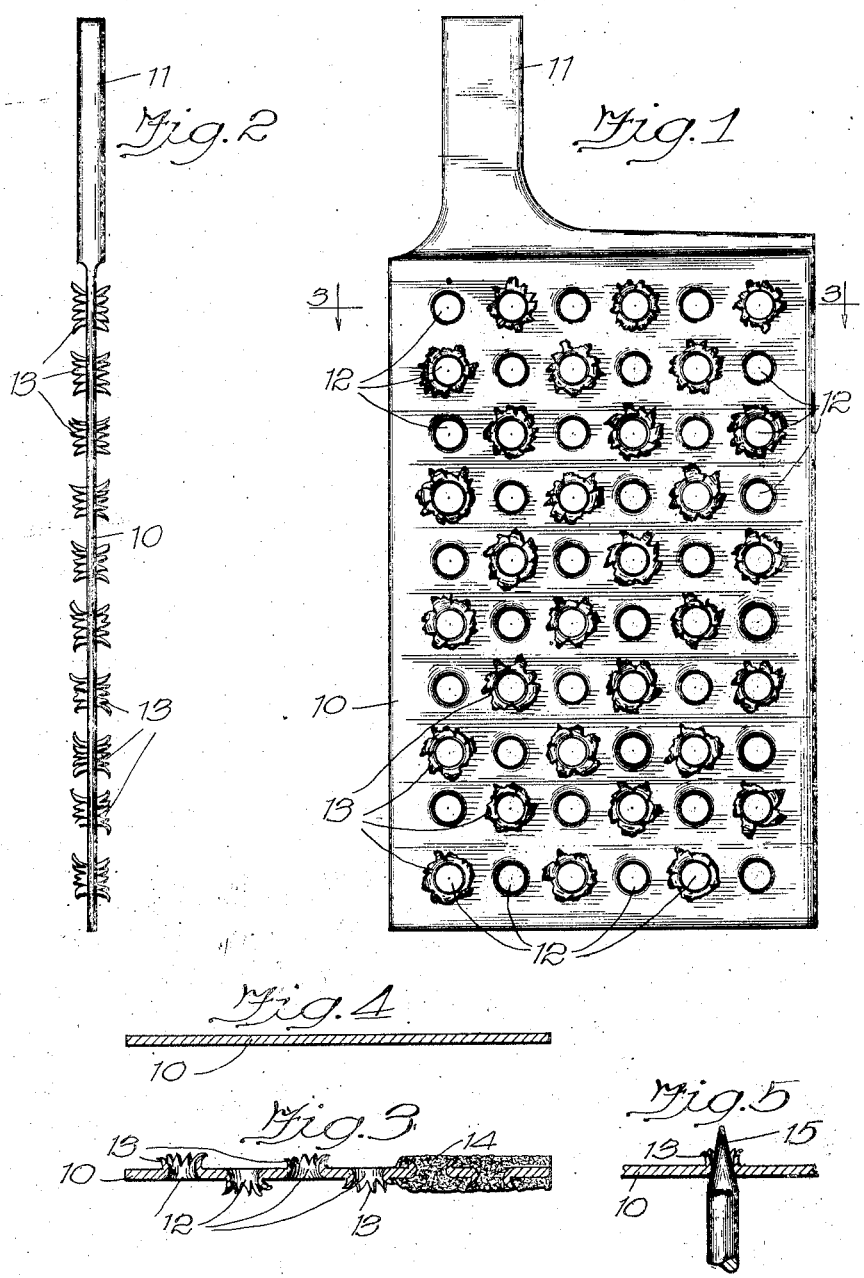

UNITED STATES PATENT OFFICE.

PAUL B. RABE, OF CHICAGO, ILLINOIS, ASSIGNOR, BY MESNE ASSIGNMENTS, TO O-K GIANT BATTERY CORPORATION, OF GARY, INDIANA, A CORPORATION OF DELAWARE.

METHOD OF MAKING GRID-PLATES.

1,369,353.   Specification of Letters Patent.   Patented Feb. 22, 1921.

Application filed April 30, 1919. Serial No. 293,605.

*To all whom it may concern:*

Be it known that I, PAUL B. RABE, a citizen of the United States, residing at Chicago, in the county of Cook and State of Illinois, have invented a certain new and useful Improvement in Methods of Making Grid-Plates, of which the following is a full, clear, concise, and exact description, reference being had to the accompanying drawings, forming a part of this specification.

My invention relates to a method of making grid plates such as are used in connection with storage batteries, and along with its primary object of providing a first-class grid plate of this class, my invention contemplates:

First: the provision of a storage battery grid plate which may be cheaply and easily manufactured;

Second: a grid plate which comprises a minimum amount of metal in its make-up;

Third: a grid plate wherein the apertures and paste-receiving and holding devices are formed by a single punching operation; and Fourth: a method of making a grid plate possessing the characteristics hereinafter mentioned.

Other objects of the invention will appear as this description progresses.

In the drawings,

Figure 1 is an elevational view of one face of a grid plate made in accordance with my invention;

Fig. 2 is a side view thereof;

Fig. 3 is a cross-sectional view of a grid plate taken on the line 3—3 of Fig. 1, this view illustrating the grid paste or compound in the course of its application;

Fig. 4 is a section similar to Fig. 3, illustrating the plate prior to the punching operation; and Fig. 5 is a fragmentary view more or less diagrammatically illustrating the method of punching the grid plate.

Similar characters of reference refer to similar parts throughout the several views.

The grid plate illustrated in Figs. 1, 2 and 3 consists of an integral piece of suitable metal cast or otherwise shaped to provide the body portion or plate proper indicated at 10, and the upwardly-extending arm 11 to which a terminal or jumper may be "burned" or otherwise electrically connected in a well-known manner when the grid plate is to be used in a storage battery cell. The grid plate is formed of any metallic material suitable for the purpose, such, for instance, as an alloy of lead and antimony, which possesses the necessary mechanical strength and at the same time will not cause local chemical action in the presence of the other substances contained in the storage battery cell.

As initially formed, the plate proper or body portion, has no paste-receiving apertures therein, but is perfectly flat and imperforate, as illustrated in Fig. 4. The plate or body portion is then subjected to the punching operation characteristic of my process and provided with the apertures and novel paste-holding devices which distinguish my finished grid plate from all other grid plates with which I am familiar.

As illustrated in the drawings, a plurality of apertures 12, 12 are formed in the body portion 10, in such a manner that the metal forced from the plane of the plate in forming said apertures is not separated from the plate but is turned up in the form of a plurality of ears around the margins of the apertures. Thus for each aperture 12 there is formed on the plate a crown-like projection or boss 13, each of which comprises a plurality of ears, all of which are integral with the grid plate.

The apertures 12, 12 are distributed over the plate in ranks and files, as illustrated in Fig. 3, and the punching is so effected that the crown-like bosses 13, associated with every other aperture of each rank and each file, lie on the same side of the grid plate, while the bosses associated with the intervening apertures lie on the other side of the plate. Thus, the bosses 13 and their several ears are evenly distributed over both sides of the plate, preferably with the same number of bosses on each side of the plate.

After the grid plate has been formed as described, any suitable grid paste or compound is applied thereto, as illustrated at 14 in Fig. 3, where but a portion of the compound or paste is shown, to illustrate the manner of its application. It will be understood that in a finished grid the paste or compound 14 is applied to both surfaces of the grid plate, filling the apertures 12, 12 and lying under and around the ears constituting the crown-like bosses 13.

While my invention is not particularly concerned with the details of the apparatus for making my grid plate in accordance with the method herein described, I will point out that the punching tools employed in the punching operation are desirably more or less pointed and cone shaped, as illustrated at 15 in Fig. 5, so that when the punching is effected the metal punched from the surface of the flat plate is not separated therefrom but is turned up in the form of ears for the purpose set forth. Commercially, the punching may be effected by means of gang punches, so that a plurality of apertures may be formed simultaneously.

Having thus described my invention, what I claim as new and desire to secure by Letters Patent of the United States is:—

The method of making a storage battery plate which consists in disrupting portions of the plate from opposite sides with cone-shaped punches to provide a plurality of apertures surrounded by irregular ragged crown like bosses.

In witness whereof, I hereunto subscribe my name this 22 day of April, 1919.

PAUL B. RABE.

Witnesses:
MARY FAE PETRIE,
EDNA V. GUSTAFSON.